(12) United States Patent
Beaujot et al.

(10) Patent No.: US 9,327,906 B2
(45) Date of Patent: May 3, 2016

(54) EXTENDABLE CONVEYOR

(71) Applicant: SeedMaster Manufacturing Ltd., Emerald Park (CA)

(72) Inventors: Norbert Beaujot, Emerald Park (CA); Matthew Petruick, Emerald Park (CA); Greg Vennard, Emerald Park (CA); Daniel Michaluk, Emerald Park (CA)

(73) Assignee: Seedmaster Manufacturing Ltd., Saskatchewan (CA)

( * ) Notice: Subject to any disclaimer, the term of this patent is extended or adjusted under 35 U.S.C. 154(b) by 0 days.

(21) Appl. No.: 14/686,394

(22) Filed: Apr. 14, 2015

(65) Prior Publication Data

US 2015/0298911 A1  Oct. 22, 2015

(51) Int. Cl.
*B65G 21/12* (2006.01)
*B65G 21/14* (2006.01)
*B65G 47/20* (2006.01)
*B65G 37/00* (2006.01)
*B65G 41/00* (2006.01)

(52) U.S. Cl.
CPC ............... *B65G 21/12* (2013.01); *B65G 21/14* (2013.01); *B65G 37/00* (2013.01); *B65G 41/002* (2013.01); *B65G 47/20* (2013.01); *B65G 2814/0328* (2013.01)

(58) Field of Classification Search
CPC ........ B65G 37/00; B65G 21/12; B65G 21/14; B65G 47/20; B65G 41/001; B65G 41/002; B65G 41/005; B65G 2814/0326; B65G 2812/0328; B65G 2812/0331
USPC ......................................................... 198/581
See application file for complete search history.

(56) References Cited

U.S. PATENT DOCUMENTS

| | | | |
|---|---|---|---|
| 3,154,189 A | | 10/1964 | O'Hanlon |
| 5,662,210 A | * | 9/1997 | Toews ............... B65G 15/08 198/581 |
| 6,068,103 A | | 5/2000 | Werner |
| 6,471,031 B1 | * | 10/2002 | Duncalf ............. B65G 21/12 198/311 |
| 6,626,285 B2 | * | 9/2003 | Enomoto ........... B23Q 11/0057 198/581 |
| 6,805,229 B2 | | 10/2004 | Dekoning |
| 7,267,519 B2 | | 9/2007 | Cresswell et al. |
| 8,479,911 B2 | | 7/2013 | Friesen |
| 8,701,868 B2 | * | 4/2014 | Hall .................. A01D 87/00 198/313 |
| 2013/0233682 A1 | * | 9/2013 | Werlinger .......... B65G 21/10 198/861.2 |

* cited by examiner

*Primary Examiner* — Mark A Deuble
(74) *Attorney, Agent, or Firm* — Nixon & Vanderhye P.C.

(57) ABSTRACT

A conveyor apparatus has a pivot frame pivotally mounted to a lower portion thereof and an actuator that pivot the pivot frame from a rear frame transport position to a forward frame operating position. A feed conveyor has a rear discharge end movably attached to an upper frame portion of the pivot frame such that the rear discharge end of the feed conveyor is above the main conveyor. The feed discharge is above the main intake and the feed conveyor extends away from the main intake and the front intake end of the feed conveyor is movable laterally when the pivot frame and feed conveyor are in the operating position, and the feed conveyor is above the main conveyor when the pivot frame and feed conveyor are in the transport position. A hopper on the feed conveyor intake has flexible panels that fold down when in the transport position.

34 Claims, 3 Drawing Sheets

EXTENDABLE CONVEYOR

CROSS-REFERENCE TO RELATED APPLICATION

This application claims priority to CA Patent Application No. 2861568, filed 17 Apr. 2014, the entire contents of which is hereby incorporated by reference.

This disclosure relates to the field of conveyors and in particular a conveyor apparatus with an extendable lower feed conveyor.

BACKGROUND

Conveyors with an extendable lower portion are known for a variety of uses, notably for extending under hopper bottom bins and trailers to receive granular material such as grain, fertilizer, and the like.

Swing conveyors are well known where a tractor is hitched to the bottom end of the main conveyor to power the apparatus, and a bottom feed conveyor section is pivotally attached at the discharge thereof to the intake of the main conveyor adjacent to the tractor. The feed conveyor swings horizontally for setting the operating position and is then is pivoted alongside the main conveyor and hoisted into the transport position with a winch, lifting the auger extension along the side of the main auger or conveyor. Maneuvering the intake of the feed conveyor to receive material from a hopper bin or trailer is problematic because of the orientation of the tractor, main conveyor, and feed conveyor. Various other conveyor configurations have been developed to facilitate receiving material from such hoppered containers.

For example U.S. Pat. No. 7,267,519 to Cresswell provides a feed conveyor that folds up about a horizontal axis onto the bottom end of the main conveyor. The Cresswell conveyor apparatus is mounted to an air cart of a modern air seeder. U.S. Pat. No. 3,154,189 to O'Hanlon shows a conveyor apparatus that is mounted on wheels and has a lower feed conveyor portion attached to the bottom end of the main conveyor that similarly folds up onto the main conveyor.

U.S. Pat. No. 8,479,911 to Friesen shows a conveyor apparatus where the lower feed conveyor is mounted to the bottom of the main conveyor on side rails such that the feed conveyor slides from a transport position resting on the lower portion of the main conveyor, outward to an operating position extending outward in alignment with the main conveyor.

U.S. Pat. No. 6,068,103 to Werner shows a feed conveyor attached to the bottom end of a main conveyor mounted on wheels. The feed conveyor pivots from a stored transport position supported beside the lower end of the main conveyor, outward to the side and then forward into alignment with the main conveyor.

U.S. Pat. No. 6,805,229 to Dekoning has no separate feed conveyor but rather the lower intake end of the conveyor telescopes in and out to facilitate receiving granular material from hopper bins, trailers and the like.

These conveyor apparatuses are more readily extendable under hoppered discharge ports however precise alignment of the feed conveyor intake with the discharge is required as lateral movement of the intake of the feed conveyor with respect to the main conveyor is not provided.

SUMMARY OF THE INVENTION

The present disclosure provides a conveyor apparatus with an extendable lower feed conveyor that overcomes problems in the prior art.

In a first embodiment the present disclosure provides a conveyor apparatus comprising a main conveyor with a main intake on a lower front intake end thereof and a main discharge on an upper rear discharge end thereof. A pivot frame is pivotally mounted to a lower portion of the main conveyor about a substantially horizontal main pivot axis oriented substantially perpendicular to the main conveyor, and an upper frame portion of the pivot frame is above the main conveyor. An actuator is operative to pivot the pivot frame such that the upper frame portion moves from a raised rear frame transport position to a lowered forward frame operating position. A feed conveyor has a feed intake at a front intake end thereof and a feed discharge at a rear discharge end thereof. A support member is mounted under a front portion of the feed conveyor and is adapted to support the front portion of the feed conveyor for movement along the ground. The rear discharge end of the feed conveyor is movably attached to the upper frame portion such that the rear discharge end of the feed conveyor is above the main conveyor. The feed discharge is above the main intake, the feed conveyor extends forward from the main intake, and the front intake end of the feed conveyor is movable laterally when the pivot frame is in the frame operating position and the feed conveyor is in a feed operating position. The feed conveyor is above and substantially aligned with the main conveyor when the pivot frame is in the frame transport position and the feed conveyor is in a feed transport position.

In a second embodiment the present disclosure provides a conveyor apparatus comprising a main conveyor with a main intake on a lower front intake end thereof and a main discharge on an upper rear discharge end thereof. A feed conveyor with a feed intake at a front intake end thereof and a feed discharge at a rear discharge end thereof is movably attached to the main conveyor such that the feed conveyor is movable from a feed transport position, where the feed conveyor is supported on the main conveyor, to a feed operating position, where the feed discharge is above the main intake and the feed conveyor extends forward from the main intake. The feed intake comprises an opening in a top side of the feed conveyor extending rearward from the front intake end thereof, and flexible fabric hopper panels extending upward and outward from the opening and configured to direct granular material into the feed intake when the hopper panels are in a panel operating position. A hopper folding mechanism is operative to automatically fold the hopper panels down to a panel transport position in proximity to the top side of the feed conveyor when the feed conveyor moves from the feed operating position to the feed transport position, and operative to automatically fold the hopper panels up to the panel operating position when the feed conveyor moves to the feed operating position.

The present disclosure provides a conveyor apparatus with a main conveyor and an extendible feed conveyor that is supported on the lower portion of the main conveyor for transport and then moves forward to a feed operating position to receive granular material from a container discharge and transfer same to the intake of the main conveyor, and which feed conveyor can move laterally to facilitate alignment of the feed intake with a container discharge. The apparatus includes a hopper that directs material into the feed intake. The hopper remains folded against the top of the feed conveyor and out of the way until the feed conveyor is almost fully extended, facilitating positioning of the feed intake in confined areas.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
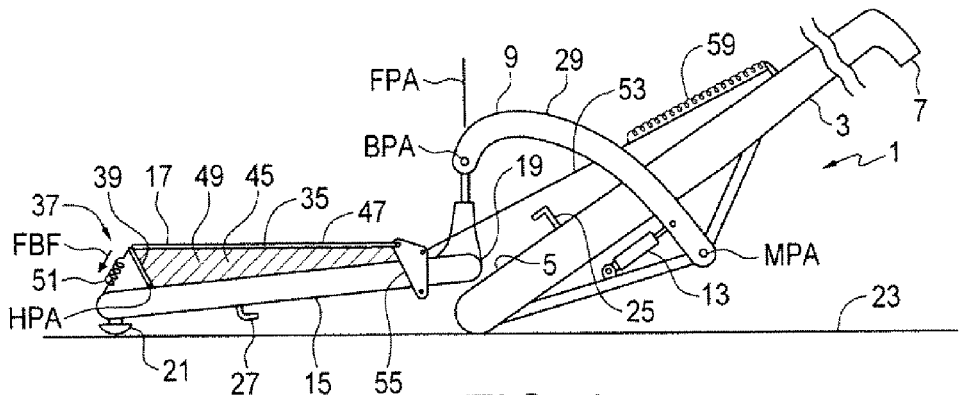
FIG. 1 is a schematic side view of an embodiment of a conveyor apparatus of the present disclosure with the feed conveyor in a fully extended feed operating position and movably attached to the pivot frame about a pivot axis.
Figure 2:
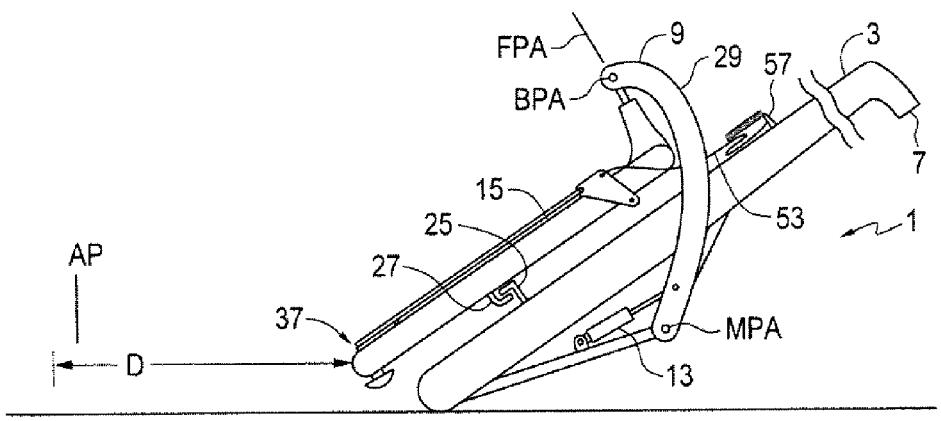
FIG. 2 is a schematic side view of the embodiment of FIG. 1 with the feed conveyor in a fully retracted feed transport position.
Figure 3:
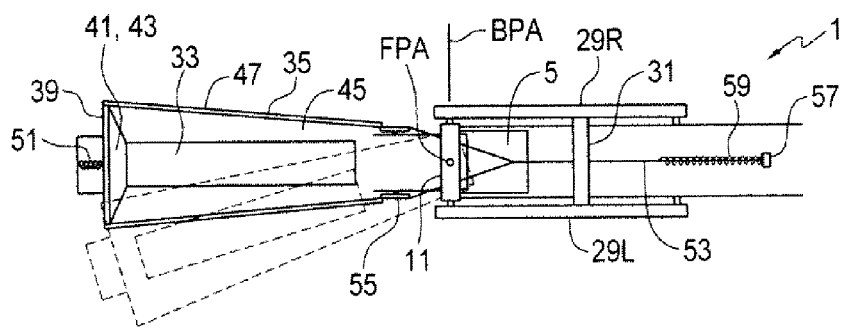
FIG. 3 is a schematic top view of an embodiment of FIG. 1 with the feed conveyor in a fully extended feed operating position and showing lateral movement by pivoting the feed conveyor about the feed pivot axis in phantom lines.

FIGS. 1-3 schematically illustrate an embodiment of a conveyor apparatus 1 of the present disclosure. The apparatus 1 comprises a main conveyor 3 with a main intake 5 on a lower front intake end thereof and a main discharge 7 on an upper rear discharge end thereof. A pivot frame 9 is pivotally mounted to a lower portion of the main conveyor 3 about a substantially horizontal main pivot axis MPA oriented substantially perpendicular to the main conveyor 3. The upper portion of the pivot frame 9 comprises a crossbar 11 extending laterally across the main conveyor 3 and above the main conveyor 3. An actuator, illustrated as a hydraulic cylinder 13, is operative to pivot the pivot frame 9 from a raised rear frame transport position illustrated in FIG. 2 to a lowered forward frame operating position illustrated in FIG. 1.

Figure 4:
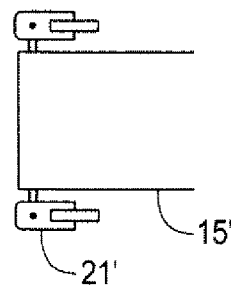
FIG. 4 is a schematic top view of an alternate feed conveyor support member comprising caster wheels.

A feed conveyor 15 has a feed intake 17 at a front intake end thereof and a feed discharge 19 at a rear discharge end thereof. A support member, illustrated as a skid plate 21, is mounted under a front portion of the feed conveyor 15 and is adapted to support the front portion of the feed conveyor 15 for movement along the ground 23. FIG. 4 schematically illustrates an alternate support member comprising a caster wheel arrangement 21' configured to support the front portion of the feed conveyor 15'. The illustrated support members 21, 21' facilitate lateral movement of the front end of the feed conveyor, as described further below.

The rear discharge end of the feed conveyor 15 is movably attached to the upper portion of the pivot frame 9. In the apparatus 1 the rear discharge end of the feed conveyor 15 is pivotally attached to the crossbar 11 about a feed pivot axis FPA such that the rear discharge end of the feed conveyor 15 is under the crossbar 11 and above the main conveyor 3. The feed discharge 19 is above the main intake 5 and the feed pivot axis FPA is substantially vertical when the pivot frame 9 is in the frame operating position of FIG. 1 and the feed conveyor 15 is in a feed operating position.

The vertical orientation of the feed pivot axis when the feed conveyor 15 is in the feed operating position allows the front intake end of the feed conveyor 15 to be moved laterally as schematically illustrated in FIG. 3. Such conveyors with a main conveyor and a movable feed conveyor are typically maneuvered into a position to receive granular material from a container discharge such as a bin or a truck box, and the lateral movement ability provided by the present conveyor apparatus 1 facilitates alignment of the feed intake 17 with the container discharge. The feed discharge 19 remains substantially aligned with the main intake 5 as the feed conveyor 15 pivots about the feed pivot axis FPA, and typically guide flaps will be provided to guide the granular material from the feed discharge 19 into the main intake 5 and prevent spillage.

As seen in FIG. 2, the feed conveyor 15 is above and aligned with the main conveyor 3 when the pivot frame 9 is in the frame transport position of FIG. 2 and the feed conveyor 15 is in a feed transport position. A fixed rest member 25 extends laterally above the lower portion of the main conveyor 3 and is attached to the main conveyor 3 and the feed conveyor 15 rests on the fixed rest member 25 when in the feed transport position of FIG. 2. A hook 27 is mounted on an underside of the feed conveyor 15 and engages the fixed rest member 27 when the feed conveyor 15 is in the feed transport position to secure the feed conveyor 15 to the main conveyor 3.

In the illustrated apparatus 1 the main pivot axis MPA is below the main conveyor 3, and the pivot frame 9 comprises right and left pivot arms 29R, 29L pivotally attached at lower ends thereof about the main pivot axis MPA, and the crossbar 11 extends between upper ends of the right and left arms 29 above the main conveyor 3 and is connected to the upper ends of the right and left arms 29 about a bar pivot axis BPA oriented substantially parallel to the main pivot axis MPA. A brace member 31 extends between the right and left arms 29 above the main conveyor 3.

In the illustrated apparatus 1, the feed intake 17 comprises an opening 33 in a top side of the feed conveyor 15 extending rearward from the front intake end thereof, and hopper panels 35 extending upward and outward from the opening 33 and configured to direct granular material into the opening 33 of the feed intake 17 when the hopper panels 35 are in a panel operating position as shown in FIGS. 1 and 3.

The hopper panels 35 are made from a flexible fabric material, and a hopper folding mechanism 37 is operative to fold the hopper panels 35 down to a panel transport position shown in FIG. 2, where the hopper panels 35 are in proximity to the top side of the feed conveyor 15, when the feed conveyor 15 moves from the feed operating position of FIG. 1 to the feed transport position of FIG. 2. The hopper folding mechanism 37 is further operative to fold the hopper panels 35 up to the panel operating position of FIG. 1 when the feed conveyor 15 moves to the feed operating position of FIG. 1.

The area under a container discharge can be fairly confined, and maneuvering the feed intake under the discharge can be difficult. The hopper panels 35 are required to be in the panel operating position when the feed conveyor 15 is in the feed operating position, but as described below, in the illustrated apparatus 1 during most of the travel distance of the feed conveyor 15 from the feed transport position to the feed operating position the panels 35 remain in the panel transport position of FIG. 2. Maneuvering the intake under the discharge is thus facilitated as the hopper panels 35 remain down against the top of the feed conveyor.

The apparatus 1 comprises a front hopper frame 39 pivotally mounted to an upper front portion of the feed conveyor 15 about a hopper pivot axis HPA oriented horizontally and perpendicular to the feed conveyor 15, and a front fabric sheet 41 extending across the front hopper frame 39 to form a front hopper panel 43. Right and left hopper panels 45 are formed by right and left hopper rods 47 pivotally attached at front ends thereof to upper portions of corresponding right and left sides of the front hopper frame 39 and extending rearward, and right and left fabric sheets 49 extending rearward from the front hopper frame 39 between the top of the feed conveyor 15 and corresponding right and left hopper rods 47.

The hopper folding mechanism 37 comprises a hopper bias element 51 operative to exert a forward and downward bias force FBF on the front hopper frame 39 urging the front hopper frame 39 toward the panel transport position, and a tether 53 attached to rear portions of the right and left hopper panels 45 and operative, when the feed conveyor 15 moves to the operating position, to exert a rearward tether force TF on the right and left hopper panels 45 and pull the front hopper panel 43 and right and left hopper panels 45 rearward and upward to the panel operating position.

In the illustrated apparatus 1, the hopper folding mechanism 37 further comprises right and left hopper brackets 55 pivotally mounted to a rear portion of the feed conveyor about a bracket pivot axis BPA oriented substantially parallel to the hopper pivot axis HPA. The rear ends of the right and left hopper rods 47 are pivotally attached to the corresponding right and left hopper brackets 55, and the tether 53 is attached to the right and left hopper brackets 55.

Figure 5:
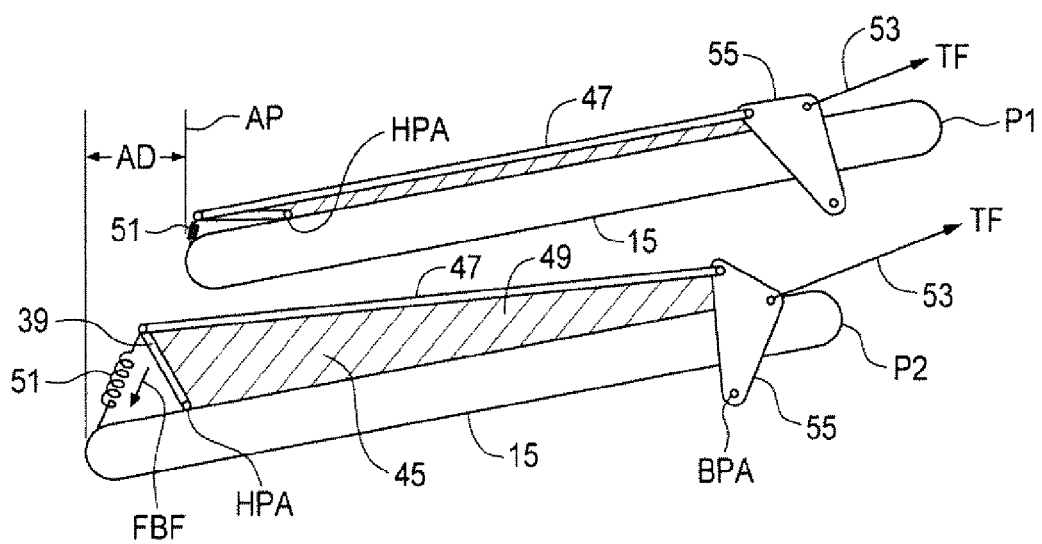
FIG. 5 is a schematic side view of the feed conveyor of the embodiment of FIG. 1 in position P1 with the feed conveyor at the activation point and at position P2 with the feed conveyor in the fully extended feed operating position

The hopper folding mechanism 37 is configured such that the hopper panels 35 remain in the panel transport position as the feed conveyor 15 moves from the feed transport position of FIG. 2 forward in direction F toward the feed operating position of FIG. 1 until the feed conveyor 15 reaches an activation point AP illustrated in FIG. 5. Until the feed conveyor 15 reaches the activation point AP the tether force TF is insufficient to overcome the forward bias force FBF exerted on the front hopper frame 39. In the illustrated apparatus 1, the tether 53 is attached at its rear end to a bracket 57 on the main conveyor 3 and is slack, exerting virtually no tether force, until the feed conveyor 15 reaches the activation point AP, at which time the tether 53 tightens and exerts the tether force TF which overcomes the forward bias force FBF and the front hopper frame 39 then starts to move upward and the hopper panels 53, 45 begin to move toward the panel operating position.

FIG. 5 schematically illustrates the feed conveyor in position P1 at the activation point AP and shows that the feed conveyor 15 moves only a relatively short activation distance AD between the activation point AP and the fully extended feed operating position shown as P2. Thus the hopper panels 43, 45 remain down while the feed conveyor is moved most of the way to the operating position, and only in the final short distance of travel AD do the panels move upward.

As shown in FIG. 2 the feed conveyor 15 moves a total distance D forward from the feed transport position to the feed operating position, and it is contemplated that for most applications the activation point AP will be reached when the feed conveyor 15 has moved forward a distance of greater than about 0.9 D, or at least 90% of the travel distance between the transport and operating positions. A tether bias element 59 is schematically illustrated to put some tension on the tether 53 and gather some of the slack in the tether when the feed conveyor is in the feed transport position.

It is also contemplated that the tether 53 could be operated manually to raise the hopper panels 43, 45 however the automatic panel raising provided by the disclosed hopper folding mechanism 37 is quick and convenient.

Figure 6:
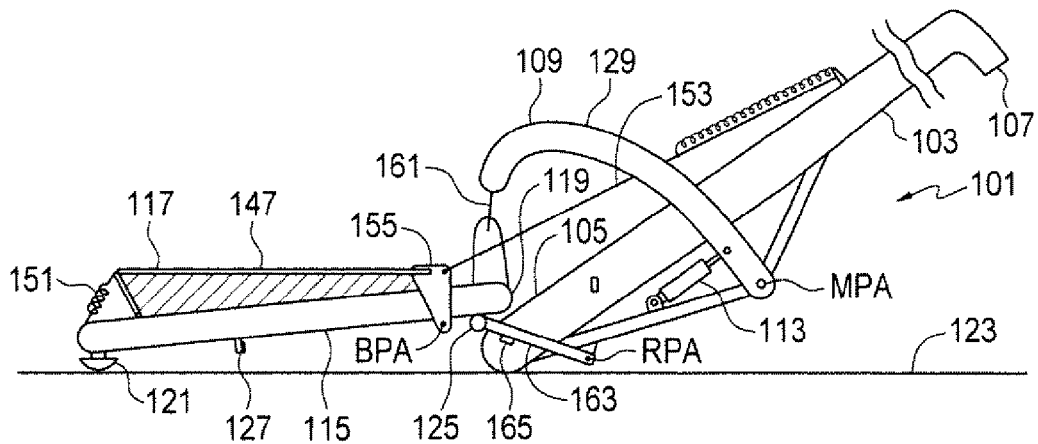
FIG. 6 is a schematic side view of an alternate embodiment of a conveyor apparatus of the present disclosure with the feed conveyor in a fully extended feed operating position and movably attached to the pivot frame by a flexible member.
Figure 7:
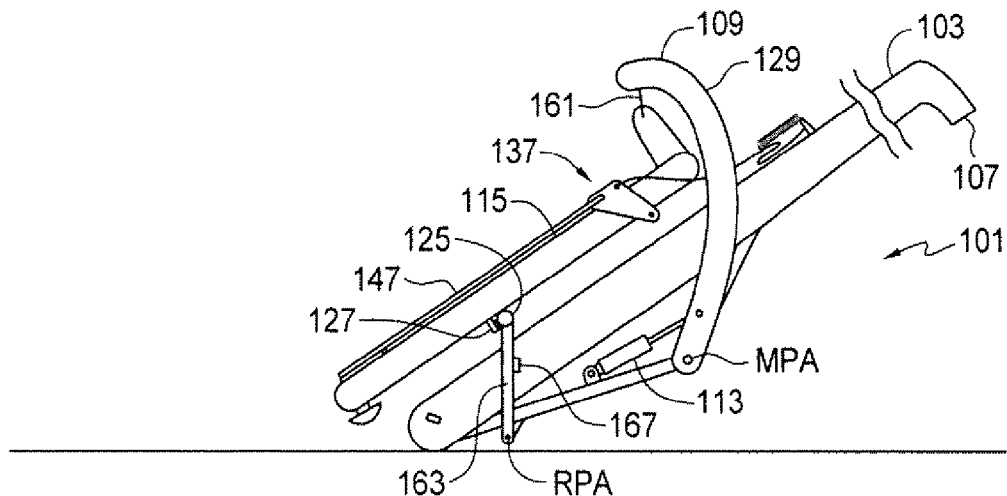
FIG. 7 is a schematic side view of the embodiment of FIG. 6 with the feed conveyor in a fully retracted feed transport position.
Figure 8:
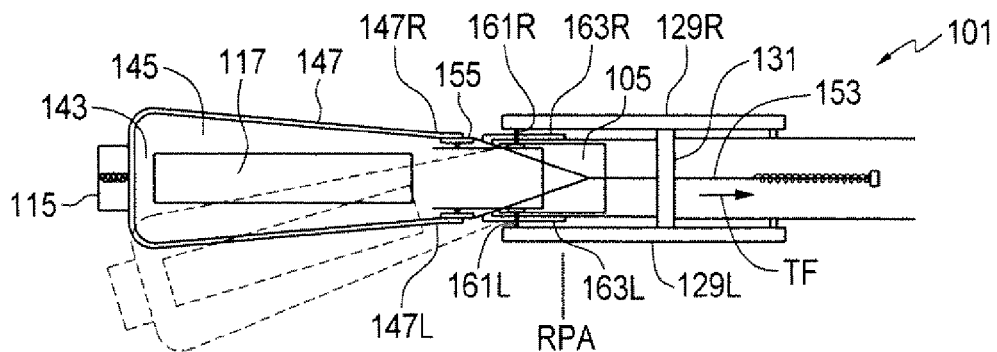
FIG. 8 is a schematic top view of an embodiment of FIG. 6 with the feed conveyor in a fully extended feed operating position and showing lateral movement by pivoting the feed conveyor about the feed pivot axis in phantom lines.

FIGS. 6-8 schematically illustrate an alternate conveyor apparatus 101 of the present disclosure with a main conveyor 103 with a main intake 105 on a lower front intake end thereof and a main discharge 107 on an upper rear discharge end thereof. A pivot frame 109 is pivotally mounted to a lower portion of the main conveyor 103 about a substantially horizontal main pivot axis MPA oriented substantially perpendicular to the main conveyor 103, and an upper frame portion of the pivot frame 109 is above the main conveyor. In the illustrated apparatus 101 the upper frame portion is provided by upper ends of the right and left pivot arms 129R, 129L.

An actuator, illustrated as hydraulic cylinder 113, is operative to pivot the pivot frame 109 such that the upper frame portion moves from a raised rear frame transport position as illustrated in FIG. 2 to a lowered forward frame operating position as illustrated in FIG. 1. The hydraulic cylinder 113 could pivot both pivot arms 129 by acting against a cross piece connecting the arms 129, or right and left hydraulic cylinders could be used to pivot corresponding right and left arms 129.

A feed conveyor 115 has a feed intake 117 at a front intake end thereof and a feed discharge 119 at a rear discharge end thereof. A support member, illustrated as a skid plate 121, is mounted under a front portion of the feed conveyor 115 and supports the front portion of the feed conveyor 115 for movement along the ground 123.

As in the apparatus 1 described above, the rear discharge end of the feed conveyor 115 is movably attached to the upper frame portion of the pivot frame 109, here provided by upper ends of the right and left pivot arms 129R, 129L, such that the rear discharge end of the feed conveyor 115 is above the main conveyor 103.

As schematically illustrated in 6 the feed discharge 119 is above the main intake 105, the feed conveyor 115 extends forward from the main intake 105, and the front intake end of the feed conveyor 115 is movable laterally, as schematically illustrated in FIG. 8, when the pivot frame 109 is in the frame operating position and the feed conveyor 115 is in a feed operating position as shown in FIGS. 6 and 8.

As schematically illustrated in FIG. 7, the feed conveyor 115 is above and substantially aligned with the main conveyor 103 when the pivot frame 109 is in the frame transport position and the feed conveyor 115 is in a feed transport position.

In the apparatus 101, the rear discharge end of the feed conveyor 11 is movably attached to the upper frame portion of the pivot frame 109 by flexible members 161, provided by cables, chains, ropes, or the like, attached at upper ends thereof to the upper frame portion and attached at lower ends thereof to the feed conveyor 115. The flexible members 161 allow the front feed end of the feed conveyor to be moved laterally as shown in phantom lines in FIG. 8.

In the illustrated apparatus 101 the upper frame portion of the pivot frame 109 comprises right and left pivot arms 129 pivotally attached at lower ends thereof about the main pivot axis MPA, and the rear discharge end of the feed conveyor 115 is movably attached to the upper frame portion by right and left flexible members 161R, 161L attached at upper ends thereof to upper ends of the corresponding right and left pivot arms 129R, 129L and attached at lower ends thereof to the feed conveyor 115.

In the illustrated apparatus 101 the main pivot axis MPA is below the main conveyor 103 and the pivot frame 109 comprises a brace member 131 extending between the right and left arms 129 above the main conveyor 103.

In the apparatus 101, right and left rest arms 163 pivotally are attached at lower ends thereof to the main conveyor about a rest pivot axis RPA oriented substantially parallel to the main pivot axis MPA, and a pivoting rest member 125 extends between top ends of the right and left rest arms 163R, 163L. The rest arms 163 pivot from a lowered rest operating position bearing against lower rest stops 165 where the pivoting rest member 125 supports the feed conveyor 115 in the feed operating position of FIG. 6, to a raised rest transport position bearing against upper rest stops 167 and supporting the feed conveyor in the feed transport position of FIG. 7.

A hook 127 is mounted on an underside of the feed conveyor 115 and is configured to engage the pivoting rest member 125 as the feed conveyor 115 moves from the feed operating position to the feed transport position, and to move the rest arms 163 from the rest operating position to the rest transport position.

In the apparatus 101, again somewhat different that in the apparatus 1, the upper edges of the front hopper panel 143 and the right and left hopper panels 145 are attached to a hoop member 147 and the hopper folding mechanism 137 is operative to raise and lower the hoop member 147 to move the hopper panels between the panel transport position of FIG. 7 and the panel operating position shown in FIGS. 6 and 8.

The hopper folding mechanism 137 comprises right and left hopper brackets 155 pivotally mounted to a rear portion of the feed conveyor 115 about a bracket pivot axis BPA oriented substantially parallel to the main pivot axis MPA. The right and left rear ends 147R, 147L of the hoop member 147 are rigidly attached to the corresponding right and left hopper brackets 155, and wherein the hopper folding mechanism 137 is operative to pivot the right and left hopper brackets 155 to raise and lower the hoop member. A tether 153 is attached to the main conveyor 103 and to the right and left hopper brackets 155 and is operative, when the feed conveyor 115 moves to the operating position, to exert a rearward tether force TF on the right and left hopper brackets 155, as described above with respect to apparatus 1, and pivot the right and left hopper brackets 155 rearward to raise the hoop member 147 and move the hopper panels 143, 145 to the panel operating position.

When the feed conveyor 115 moves back to the feed transport position, the tether force TF is released and the hoop member 147 moves down under gravity and the flexible panels 143, 145 collapse to the panel transport position and the whole rests on the top of the feed conveyor 115. A light bias element 151 may be included to exert a downward force on the hoop member 147 to secure same against movement due to wind or the like during transport, while allowing the hoop member 147 to move up to the panel operating position.

The apparatus 1, 101 of the present disclosure thus provides a main conveyor 3, 103 with an extendible feed conveyor 15, 115 that is supported on the lower portion of the main conveyor for transport and then moves forward to a feed operating position which allows lateral movement to facilitate alignment of the feed intake 17, 117 with a container discharge. To facilitate maneuvering the feed intake 17, 117 under the container discharge the hopper directing material into the feed intake remains folded against the top of the feed conveyor and out of the way until the feed conveyor is almost fully extended.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A conveyor apparatus comprising:
   a main conveyor with a main intake on a lower front intake end thereof and a main discharge on an upper rear discharge end thereof;
   a pivot frame pivotally mounted to a lower portion of the main conveyor about a substantially horizontal main pivot axis oriented substantially perpendicular to the main conveyor wherein an upper frame portion of the pivot frame is above the main conveyor;
   an actuator operative to pivot the pivot frame such that the upper frame portion moves from a raised rear frame transport position to a lowered forward frame operating position;
   a feed conveyor with a feed intake at a front intake end thereof and a feed discharge at a rear discharge end thereof;
   a support member mounted under a front portion of the feed conveyor and adapted to support the front portion of the feed conveyor for movement along the ground;
   wherein the rear discharge end of the feed conveyor is movably attached to the upper frame portion such that the rear discharge end of the feed conveyor is above the main conveyor;
   wherein the feed discharge is above the main intake, the feed conveyor extends forward from the main intake, and the front intake end of the feed conveyor is movable laterally when the pivot frame is in the frame operating position and the feed conveyor is in a feed operating position; and
   wherein the feed conveyor is above and substantially aligned with the main conveyor when the pivot frame is in the frame transport position and the feed conveyor is in a feed transport position.

2. The apparatus of claim 1 wherein the rear discharge end of the feed conveyor is movably attached to the upper frame portion by a flexible member attached at an upper end thereof to the upper frame portion and attached at a lower end thereof to the feed conveyor.

3. The apparatus of claim 2 wherein the pivot frame comprises right and left pivot arms pivotally attached at lower ends thereof about the main pivot axis and wherein the rear discharge end of the feed conveyor is movably attached to the upper frame portion by right and left flexible members attached at upper ends thereof to upper ends of the corresponding right and left pivot arms and attached at lower ends thereof to the feed conveyor.

4. The apparatus of claim 3 wherein the main pivot axis is below the main conveyor and wherein the pivot frame comprises a brace member extending between the right and left arms above the main conveyor.

5. The apparatus of claim 1 wherein the pivot frame comprises right and left pivot arms pivotally attached at lower ends thereof about the main pivot axis and a crossbar extending laterally between upper ends of corresponding right and left pivot arms above the main conveyor, and wherein the rear discharge end of the feed conveyor is pivotally attached to the crossbar about a feed pivot axis that is oriented substantially vertically when the feed conveyor is in the feed operating position.

6. The apparatus of claim 5 wherein the crossbar is connected to the upper ends of the right and left arms about a bar pivot axis oriented substantially parallel to the main pivot axis.

7. The apparatus of claim 5 wherein the main pivot axis is below the main conveyor and wherein the pivot frame comprises a brace member extending between the right and left arms above the main conveyor.

8. The apparatus of claim 1 wherein the support member is provided by one of a wheel and a skid plate.

9. The apparatus of claim 8 wherein the support member is provided by a caster wheel.

10. The apparatus of claim 1 comprising a fixed rest member attached to the main conveyor and extending laterally above the lower portion of the main conveyor and wherein the feed conveyor rests on the fixed rest member when in the feed transport position.

11. The apparatus of claim 10 comprising a hook mounted on an underside of the feed conveyor and configured to engage the fixed rest member when the feed conveyor is in the feed transport position.

12. The apparatus of claim 1 comprising right and left rest arms pivotally attached at lower ends thereof to the main conveyor about a rest pivot axis oriented substantially parallel to the main pivot axis, and a pivoting rest member extending between top ends of the right and left rest arms, wherein the rest arms pivot from a lowered rest operating position bearing against lower rest stops where the pivoting rest member supports the feed conveyor in the feed operating position, to a raised rest transport position bearing against upper rest stops where the pivoting rest member supports the feed conveyor in the feed transport position.

13. The apparatus of claim 12 comprising a hook mounted on an underside of the feed conveyor and configured to engage the pivoting rest member as the feed conveyor moves from the feed operating position to the feed transport position, and to move the rest arms from the rest operating position to the rest transport position.

14. The apparatus of claim 1 wherein the feed intake comprises an opening in a top side of the feed conveyor extending rearward from the front intake end thereof, and hopper panels extending upward and outward from the opening and configured to direct granular material into the feed intake when the hopper panels are in a panel operating position.

15. The apparatus of claim 14 wherein the hopper panels are made from a flexible fabric material, and comprising a hopper folding mechanism operative to fold the hopper panels down to a panel transport position in proximity to the top side of the feed conveyor when the feed conveyor is in the feed transport position, and operative to fold the hopper panels up to the panel operating position when the feed conveyor is in the feed operating position.

16. The apparatus of claim 15 wherein the hopper folding mechanism is configured to automatically fold the hopper panels down to a panel transport position in proximity to the top side of the feed conveyor when the feed conveyor moves from the feed operating position to the feed transport position, and operative to automatically fold the hopper panels up to the panel operating position when the feed conveyor moves to the feed operating position.

17. The apparatus of claim 16 wherein the hopper folding mechanism is configured such that the hopper panels remain in the panel transport position as the feed conveyor moves from the feed transport position toward the feed operating position until the feed conveyor reaches an activation point, and as the feed conveyor moves past the activation point, the hopper panels begin to move toward the panel operating position.

18. The apparatus of claim 17 wherein the feed conveyor moves a total distance D forward from the feed transport position to the feed operating position, and wherein the activation point is reached when the feed conveyor has moved forward a distance greater than about 0.9 D.

19. The apparatus of claim 16 comprising:
a front hopper frame pivotally mounted to an upper front portion of the feed conveyor about a hopper pivot axis oriented substantially horizontally and perpendicular to the feed conveyor, and a front fabric sheet extending across the front hopper frame to form a front hopper panel;
right and left hopper panels comprising right and left hopper rods pivotally attached at front ends thereof to upper portions of corresponding right and left sides of the front hopper frame and extending rearward, and right and left fabric sheets extending rearward from the front hopper frame between the top of the feed conveyor and corresponding right and left hopper rods;
wherein the hopper folding mechanism comprises a hopper bias element operative to exert a forward bias force on the front hopper frame urging the front hopper frame toward the panel transport position, and a tether attached to rear portions of the right and left hopper panels and operative, when the feed conveyor moves to the operating position, to exert a rearward tether force on the right and left hopper panels and pull the front hopper panel and right and left hopper panels rearward and upward to the panel operating position.

20. The apparatus of claim 19 comprising right and left hopper brackets pivotally mounted to a rear portion of the feed conveyor about a bracket pivot axis oriented substantially parallel to the hopper pivot axis, and wherein the rear ends of the right and left hopper rods are pivotally attached to the corresponding right and left hopper brackets, and wherein the tether is attached to the right and left hopper brackets.

21. The apparatus of claim 20 wherein the hopper folding mechanism is configured such that the hopper panels remain in the panel transport position as the feed conveyor moves from the feed transport position toward the feed operating position until the feed conveyor reaches an activation point, and the tether force is insufficient to overcome the forward bias force on the front hopper frame until the feed conveyor reaches the activation point, at which time the front hopper frame starts to move toward the panel operating position.

22. The apparatus of claim 16 wherein upper edges of the hopper panels are attached to a hoop member and wherein the hopper folding mechanism is operative to raise and lower the hoop member to move the hopper panels between the panel transport position and the panel operating position.

23. The apparatus of claim 22 comprising right and left hopper brackets pivotally mounted to a rear portion of the feed conveyor about a bracket pivot axis oriented substantially parallel to the main pivot axis, and wherein the right and left rear ends of the hoop member are rigidly attached to the corresponding right and left hopper brackets, and wherein the hopper folding mechanism is operative to pivot the right and left hopper brackets to raise and lower the hoop member.

24. The apparatus of claim 23 comprising a tether attached to the right and left hopper brackets and operative, when the feed conveyor moves to the operating position, to exert a rearward tether force on the right and left hopper brackets and pivot the right and left hopper brackets rearward to raise the hoop member and move the hopper panels to the panel operating position.

25. A conveyor apparatus comprising:
a main conveyor with a main intake on a lower front intake end thereof and a main discharge on an upper rear discharge end thereof;

a feed conveyor with a feed intake at a front intake end thereof and a feed discharge at a rear discharge end thereof, the feed conveyor movably attached to the main conveyor such that the feed conveyor is movable from a feed transport position, where the feed conveyor is supported on the main conveyor, to a feed operating position, where the feed discharge is above the main intake and the feed conveyor extends forward from the main intake;

wherein the feed intake comprises an opening in a top side of the feed conveyor extending rearward from the front intake end thereof, and flexible fabric hopper panels extending upward and outward from the opening and configured to direct granular material into the feed intake when the hopper panels are in a panel operating position;

a hopper folding mechanism operative to automatically fold the hopper panels down to a panel transport position in proximity to the top side of the feed conveyor when the feed conveyor moves from the feed operating position to the feed transport position, and operative to automatically fold the hopper panels up to the panel operating position when the feed conveyor moves to the feed operating position.

26. The apparatus of claim 25 wherein the hopper folding mechanism is configured such that the hopper panels remain in the panel transport position as the feed conveyor moves from the feed transport position toward the feed operating position until the feed conveyor reaches an activation point, and as the feed conveyor moves past the activation point, the hopper panels begin to move toward the panel operating position.

27. The apparatus of claim 26 wherein the feed conveyor moves a total distance D from the feed transport position to the feed operating position, and wherein the activation point is reached when the feed conveyor has moved a distance greater than about 0.9 D.

28. The apparatus of claim 25 comprising:
a front hopper frame pivotally mounted to an upper front portion of the feed conveyor about a hopper pivot axis oriented substantially horizontally and perpendicular to the feed conveyor, and a front fabric sheet extending across the front hopper frame to form a front hopper panel;

right and left hopper panels comprising right and left hopper rods pivotally attached at front ends thereof to upper portions of corresponding right and left sides of the front hopper frame and extending rearward, and right and left fabric sheets extending rearward from the front hopper frame between the top of the feed conveyor and corresponding right and left hopper rods;

wherein the hopper folding mechanism comprises a hopper bias element operative to exert a forward bias force on the front hopper frame urging the front hopper frame toward the panel transport position, and a tether attached to rear portions of the right and left hopper panels and operative, when the feed conveyor moves to the operating position, to exert a rearward tether force on the right and left hopper panels and pull the front hopper panel and right and left hopper panels rearward and upward to the panel operating position.

29. The apparatus of claim 28 comprising right and left hopper brackets pivotally mounted to a rear portion of the feed conveyor about a bracket pivot axis oriented substantially parallel to the hopper pivot axis, and wherein the rear ends of the right and left hopper rods are pivotally attached to the corresponding right and left hopper brackets, and wherein the tether is attached to the right and left hopper brackets.

30. The apparatus of claim 29 wherein the hopper folding mechanism is configured such that the hopper panels remain in the panel transport position as the feed conveyor moves from the feed transport position toward the feed operating position until the feed conveyor reaches an activation point, and the tether force is insufficient to overcome the forward bias force on the front hopper frame until the feed conveyor reaches the activation point, at which time the front hopper frame starts to move toward the panel operating position.

31. The apparatus of claim 28 comprising a tether bias element operative put the tether into tension.

32. The apparatus of claim 25 wherein upper edges of the hopper panels are attached to a hoop member and wherein the hopper folding mechanism is operative to raise and lower the hoop member to move the hopper panels between the panel transport position and the panel operating position.

33. The apparatus of claim 32 comprising right and left hopper brackets pivotally mounted to a rear portion of the feed conveyor about a bracket pivot axis oriented substantially parallel to the main pivot axis, and wherein the right and left rear ends of the hoop member are rigidly attached to the corresponding right and left hopper brackets, and wherein the hopper folding mechanism is operative to pivot the right and left hopper brackets to raise and lower the hoop member.

34. The apparatus of claim 33 comprising a tether attached to the right and left hopper brackets and operative, when the feed conveyor moves to the operating position, to exert a rearward tether force on the right and left hopper brackets and pivot the right and left hopper brackets rearward to raise the hoop member and move the hopper panels to the panel operating position.

* * * * *